Sept. 13, 1932.          C. LINDLEY, JR          1,877,479
FRUIT PACKING DEVICE
Filed Feb. 18, 1930          4 Sheets-Sheet 1
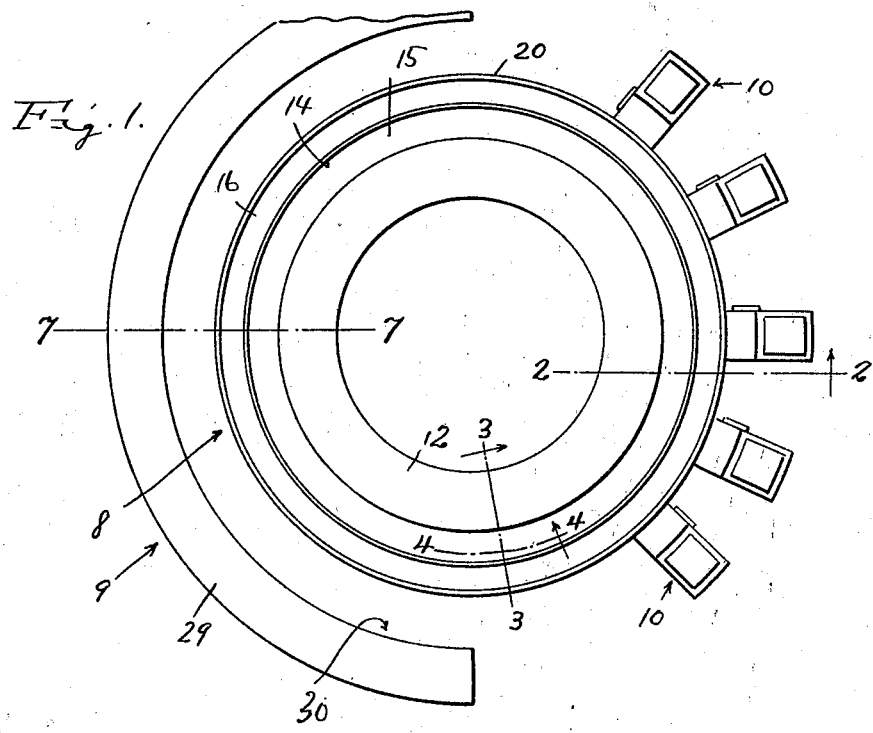
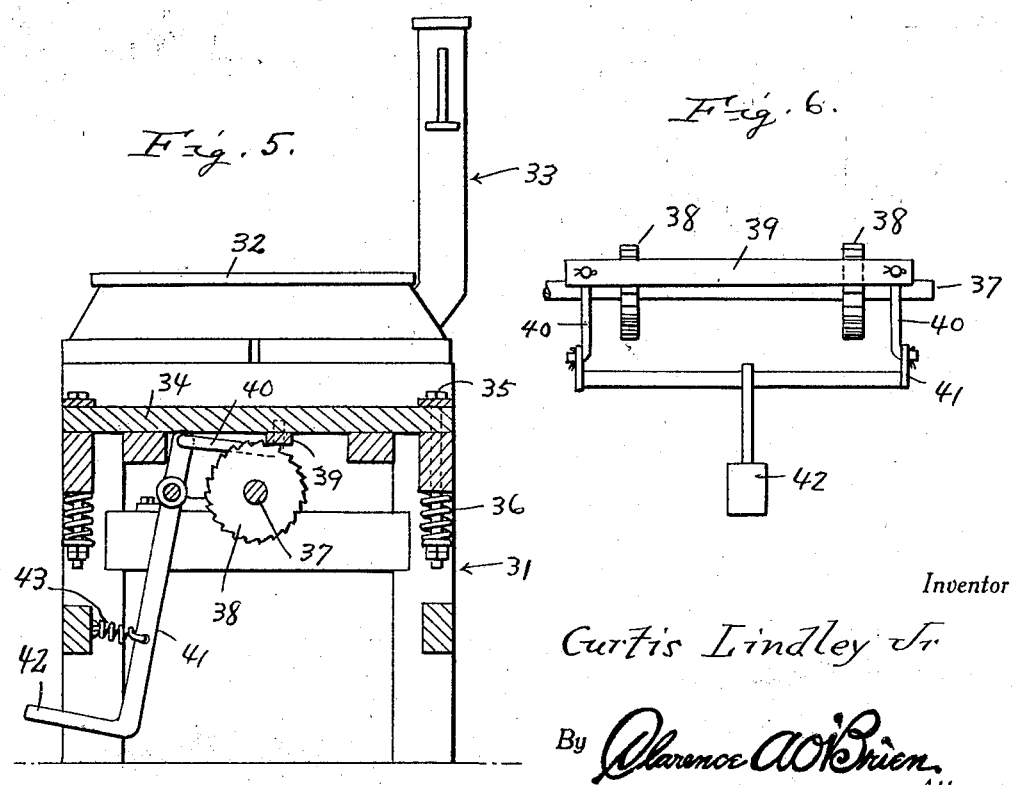
Inventor
Curtis Lindley Jr
By Clarence A. O'Brien
Attorney

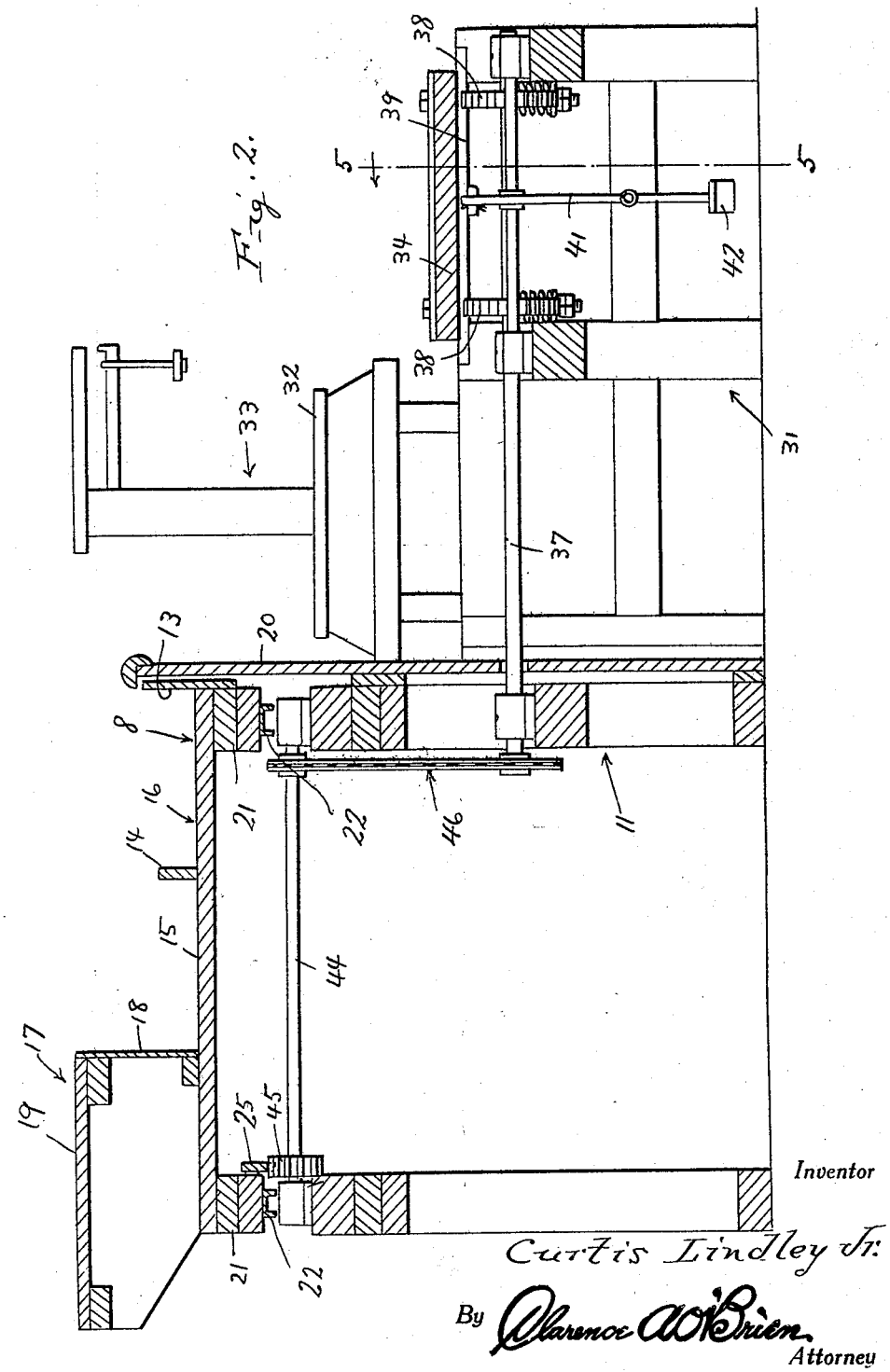

Sept. 13, 1932.  C. LINDLEY, JR  1,877,479
FRUIT PACKING DEVICE
Filed Feb. 18, 1930  4 Sheets-Sheet 3

Inventor
Curtis Lindley Jr
By Clarence A O'Brien
Attorney

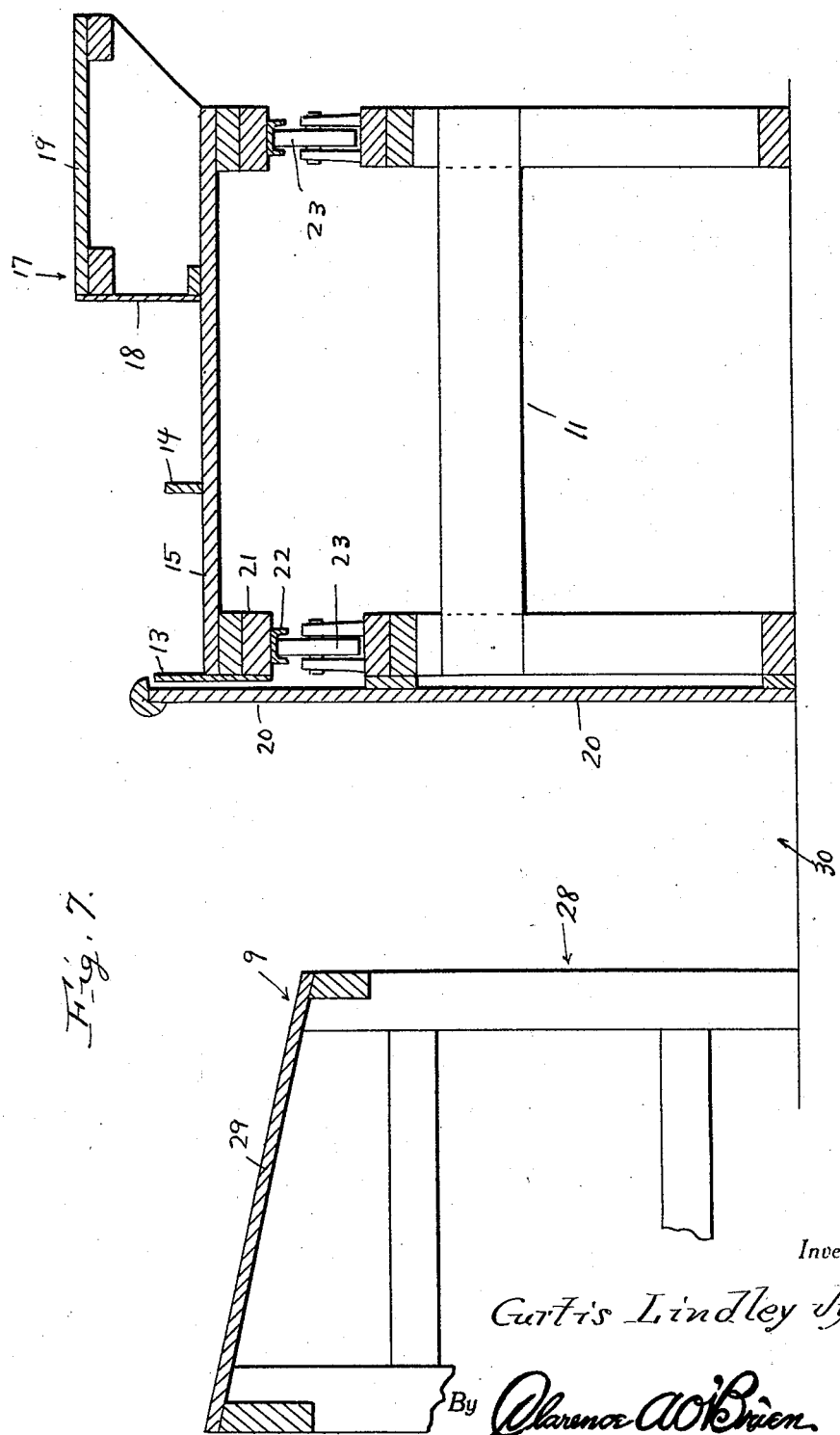

Patented Sept. 13, 1932

1,877,479

UNITED STATES PATENT OFFICE

CURTIS LINDLEY, JR., OF EMPIRE, CALIFORNIA

FRUIT PACKING DEVICE

Application filed February 18, 1930. Serial No. 429,306.

This invention relates to an improved apparatus or device which is especially constructed and conditioned for efficient and serviceable use to assist the operation of manual workers in handling and packing fruit, especially grapes.

My principal aim is to provide a practical assemblage of mechanical units occupying a systematic and concentrated relationship which assists attendants in handling, distributing, and classifying the different grades of fruit.

In accordance with the inventive conception, I have organized the different details of the composite structure in a convenient manner to aid in assorting and packing, the principal purpose of the assembly of units is to minimize labor, to standardize packing by weight, and to otherwise fulfill the requirements of a structure of this class in a simple and economical manner.

Briefly stated, the improved structure is characterized by a centralized revolving table constructed to facilitate classification and assorting. On one side of the table is a counter-like rack for reception of the field receptacles, and at a substantially diametrically opposite side of the table are packing stands conveniently arranged to fulfill the common purpose of efficient and modernized packing.

In the drawings:

Figure 1 is a top plan view of the general assembly showing the mechanical relationship of the various details.

Figure 2 is an enlarged sectional view taken approximately on the plane of the line 2—2 of Figure 1.

Figure 5 is a sectional and elevational view of one of the packing stands.

Figure 6 is an elevational view of certain details of said packing stand.

Figure 7 is a sectional view on the line 7—7 of Figure 1.

Figure 4:
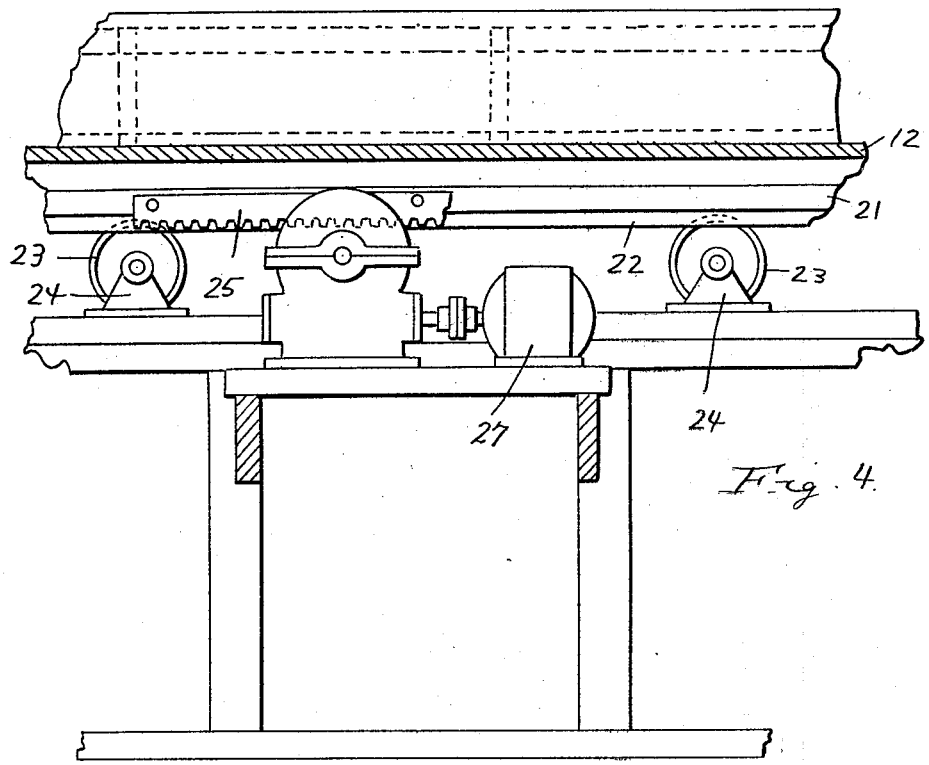
Figure 4 is a longitudinal or circumferential fragmentary section taken approximately on the plane of the line 4—4 of Figure 1.

Attention is first invited to Figure 1. Here, the reference character 8 designates generally the rotary table or carrier. This is of general annular configuration in top plan.

Located on one side of this is the receiving rack 9. This is in the nature of a substantially semi-circular horizontal counter.

Located at a diametrically opposite point and spaced from the ends of the counter are the packing stands generally designated by the numerals 10.

Figure 3:
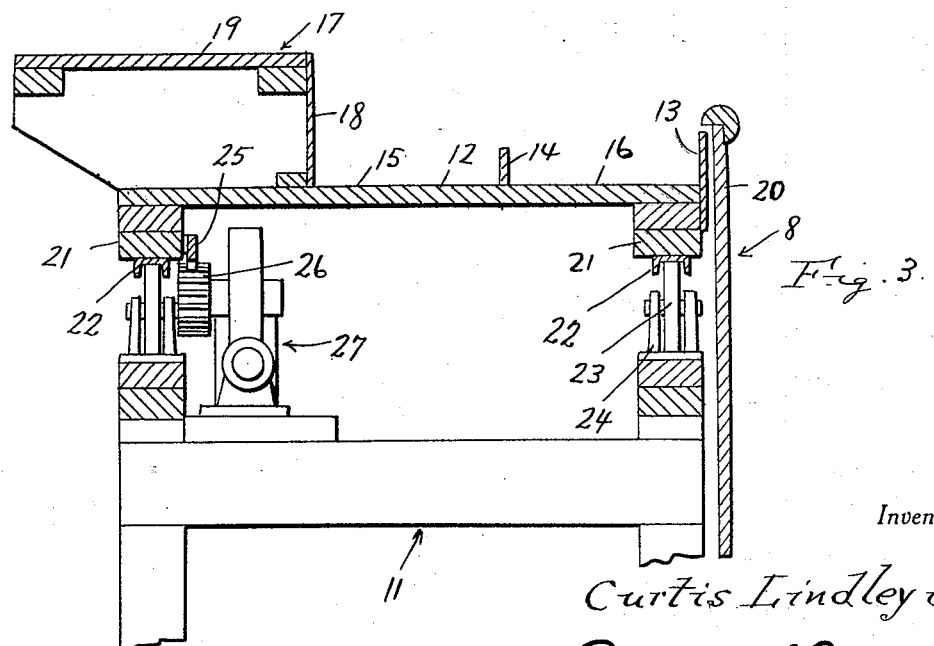
Figure 3 is a similar sectional view on the line 3—3 of Figure 1.

Directing attention to Figure 3, it will be observed that the frame structure of the table is indicated by the numeral 11 and this is of appropriate design to accommodate the revolving annulus 12. This revolving annulus is in the nature of a flat board or the like and it has a rim 13 on its inner periphery and a partition strip as at 14, dividing it into assorting channels 15 and 16 respectively. The numeral 17 represents what may be designated as an elevated deck, and this includes a riser 18 and a suitable rest 19 on which empty packing boxes and crates (not shown) are placed for convenient use by the packers at the stands 10.

The numeral 20 designates the vertical wall which functions as a guard. This is stationary. As seen in Figure 3, the numeral 21 designates a ring-like rail carrying correspondingly shaped tracks 22 cooperable with supporting rollers 23 located in the brackets 24 on the frame. The outer track is provided with an endless rack 25 with which is meshed a pinion 26 here shown operated by an electric motor 27. This causes the table to revolve at a predetermined speed.

The rack or counter shown in Figure 7 includes a suitable supporting frame 28 having an inwardly and downwardly inclined top 29. The fruit laden baskets or receptacles from the field are brought in and placed on this rack to facilitate picking, trimming, and handling. As before stated, this rack is of semi-circular configuration and it is spaced from the revolving table to define an aisle or lane 30 in which the workers are positioned at suitably spaced intervals. The workers may be seated or may operate in standing position.

Each of the stands 10 is the same in construction, and a description of one may suffice for all. Each stand includes as shown in Figure 5, an appropriate supporting framework 31 having two platforms. The platform 31 constitutes a part of a weighing scale generally represented by the numeral 33. The platform 34 is movably mounted on the frame 31 through the medium of bolts 35, and it will be noted that the bolts include cushioning and return springs 36. There is a shaft 37 located for rotation beneath the platforms 30 and 31, and this carries ratchet wheels 38.

The numeral 39 designates a slidably mounted impact bar connected through the medium of links 40 with a swingably mounted lever 41. The lever includes a foot pedal 42 arranged for convenient manipulation by the operator. The numeral 43 designates a return spring which when the pedal 42 is released forces the bar 39 away from the ratchet wheels. The purpose of the ratchet wheels is to ride against the bar 39 and to agitate or vibrate the platform 34 when packing grapes in sawdust.

The table shown on the drawings is sixteen feet in diameter and is to be revolved at about one revolution per minute. The rotating annulus 12 provided for the fruit is a flat deck approximately two feet in width. As grapes are seldom packed out in more than two grades the fruit deck is divided annularly into two channels approximately one foot in width each. A deck 17 at a slightly higher elevation than the fruit deck (approximately eight inches), is provided for the placement of empty containers in easy access to the reach of the packers who remove them and place them on the packing stands preparatory to packing them with fruit.

The grapes come to the packing house in special boxes used only for this purpose. These boxes containing grapes are placed on the rack 9. The sorters and trimmers stand or sit in the aisle 30 between the rack and the guard rail which surrounds the revolving table. Bunches of grapes are taken from the field boxes and after thorough trimming are placed on the fruit deck in the proper annular space according to the grade.

A space is provided for an inspector who has a fine opportunity, because of the flat deck and narrow width thereof, of making a final inspection of all fruit both as to trimming and grading before the fruit reaches the packers. The inspector will be able to change fruit from one grade to the other where the grading has been improperly done and will also readily be able to return fruit to the trimmers where the fruit has been improperly trimmed.

The ease with which an inspector as above described may supervise the work of packing done according to my method and apparatus herein described is as important if not more so, than the construction of the apparatus itself and is entirely new in the grape industry insofar as I have been able to ascertain. After passing the inspector the grapes are removed from the fruit deck and placed in the shipping containers by the packers. Any grapes not removed by the packers remain on the table and continue to travel around on same until they are removed for packing. A space is left for a workman who handles the empty containers whereby a constant supply of the containers is maintained on the container deck 17.

In handling certain varieties of grapes, the fanciest grades are packed in sawdust and a second grade is packed in the usual containers without the use of sawdust. The packing stands 10 are designed to be used for packing by either method.

The packing stands 10 are arranged radially around the side of the revolving table opposite to the side provided for the trimmers and graders. For the method employed when grapes are packed without the use of sawdust, a small pair of scales is provided on which to place the empty container to be filled. The container may be placed directly on the scales or a frame may be provided which is placed on the scales and inclines the container toward the packer. The scales are provided in order to obtain uniformity in the weight of the finished package.

Because of the flatness of the fruit deck and the narrow width thereof the packer has easy access to either grade of fruit thereon and can readily see the fruit at all times as it moves toward him on the table and can make perfect selection of bunch, size or color so that uniformity may be maintained in the same package, a very important point in high class packing.

When packing in sawdust two things are essential after the fruit has been graded. One is that the grapes must be weighed to the quantity required for the particular type of container before they are placed in the container. The second is that at intervals during the packing of a container it is necessary to beat it with mallets in order to settle the sawdust thoroughly and tightly between and around the grapes. When the packing stand is being used for making sawdust pack, the proper quantity of grapes is first removed from the proper grade space on the revolving table and placed on the scales.

At this time, I call attention to a rotary shaft mounted beneath the table and represented by the reference character 44 in Figure 2. This is provided on one end with a pinion 45 receiving motion from the annular rack 25. The numeral 46 designates a sprocket drive between the shafts 44 and the aforesaid shafts 37. The result is, that as the ratchet wheels 38 turn against the impact bar 39, the platform 34 will be elevated in a reciprocatory manner. This produces vibration which is sufficient to shake down sawdust in the containers.

The ratcheting and vibrating means operates only so long as the foot is held on the pedal 42 and the bar 39 is held in the position seen in Figure 5. By releasing the foot, the spring 43 comes into play to slide the bar 39 out of the path of rotation of the ratchet wheels 38.

If this mechanical vibrating means is not desired or not employed, the usual method of employing mallets or hand implements may be resorted to, at which time the container is struck intermittent blows to shake the sawdust down evenly.

It will be evident after reading the description in conjunction with the drawings that I have evolved and produced a simplified and systematized apparatus for conveniently regulating the handling and packing of fruit. Although the device is primarily designed for packing grapes, it is obvious that it may well serve for various other grading and assorting operations.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

An apparatus for facilitating reception, assorting, and packing of fruit and the like as described, comprising a continuously rotatable table in the form of a closed ring, an arcuate stationary table radially spaced outwardly from and at one side of the rotatable table and defining therewith an aisle, an arcuate row of circumferentially spaced stationary packing stands arranged close to the rotatable table and spaced from the ends of the arcuate stationary table, and means for rotating said rotatable table, said rotatable table comprising a base in the form of a ring, bearings on the base, a top in the form of a ring carried by the bearings, said top being rotatable relative to the base, and said top comprising a substantially horizontal surface having on the radially inward marginal portion thereof a raised platform overhanging the edge thereof, the remainder of the said surface being provided with a partition transversely dividing it into distinct annular compartments on the same level enabling continual separation of the assortments of the fruit made.

In testimony whereof I affix my signature.

CURTIS LINDLEY, JR.